United States Patent
Buttner et al.

(10) Patent No.: US 9,218,435 B2
(45) Date of Patent: Dec. 22, 2015

(54) DYNAMICALLY UPDATING WEB PAGES USING MESSAGING-ORIENTED MIDDLEWARE

(75) Inventors: Gerard John Buttner, Stony Point, NY (US); Chitra Dorai, Chappaqua, NY (US); Ahmad-Sameh Afif Fakhouri, New Rochelle, NY (US); Daniel A. Gisolfi, Hopewell, NY (US); Jianren Li, Valhalla, NY (US)

(73) Assignee: International Business Machines Corporation, Armonk, NY (US)

( * ) Notice: Subject to any disclaimer, the term of this patent is extended or adjusted under 35 U.S.C. 154(b) by 1380 days.

(21) Appl. No.: 12/127,167

(22) Filed: May 27, 2008

(65) Prior Publication Data
US 2008/0263179 A1    Oct. 23, 2008

Related U.S. Application Data

(63) Continuation of application No. 11/261,016, filed on Oct. 28, 2005, now abandoned.

(51) Int. Cl.
*G06F 17/30* (2006.01)
(52) U.S. Cl.
CPC ............................... *G06F 17/30899* (2013.01)
(58) Field of Classification Search
CPC ................................................. G06F 17/30899
USPC ........................................................ 707/613
See application file for complete search history.

(56) References Cited

U.S. PATENT DOCUMENTS

| | | | |
|---|---|---|---|
| 6,239,797 B1 * | 5/2001 | Hills et al. ................... | 715/784 |
| 6,823,359 B1 | 11/2004 | Heidingsfeld et al. | |
| 7,107,543 B2 * | 9/2006 | Berry et al. .................. | 715/749 |
| 2002/0032701 A1 * | 3/2002 | Gao et al. ..................... | 707/513 |
| 2002/0165907 A1 * | 11/2002 | Dornquast et al. ............ | 709/203 |
| 2004/0139475 A1 * | 7/2004 | Zenoni .......................... | 725/113 |
| 2004/0267781 A1 * | 12/2004 | Smolgovsky et al. ........ | 707/100 |
| 2005/0108418 A1 * | 5/2005 | Bedi et al. .................... | 709/232 |
| 2005/0119913 A1 | 6/2005 | Hornreich et al. | |
| 2006/0031282 A1 | 2/2006 | Tuttle et al. | |
| 2007/0100844 A1 | 5/2007 | Buttner et al. | |

OTHER PUBLICATIONS

Burns et al., Java Server Specification Version 1.2, Nov. 2004, Sun Microsystems, pp. 1-408.*
Ponzo et al., "ON Demand Web-Client Technologies", Jul. 2004, IBM Systems Journal, vol. 43, No. 2, pp. 297-315.
Office Action, dated Apr. 3, 2008, regarding U.S. Appl. No. 11/261,016, 6 pages.
Final Office Action, dated Oct. 10, 2008, regarding U.S. Appl. No. 11/261,016, 7 pages.

* cited by examiner

*Primary Examiner* — Jorge A Casanova
(74) *Attorney, Agent, or Firm* — Yee & Associates, P.C.; Louis J. Percello

(57) ABSTRACT

System, computer implemented method and computer program product for dynamically updating a Web page using browser-based messaging. A system for dynamically updating a Web page using browser-based messaging includes a Web page that includes a plurality of Web messaging tags, and a selected data model that can be bound to the Web messaging tags, and at least one messaging client for accepting at least one message from a message server and for processing the accepted at least one message into the selected data model.

20 Claims, 3 Drawing Sheets

FIG. 7

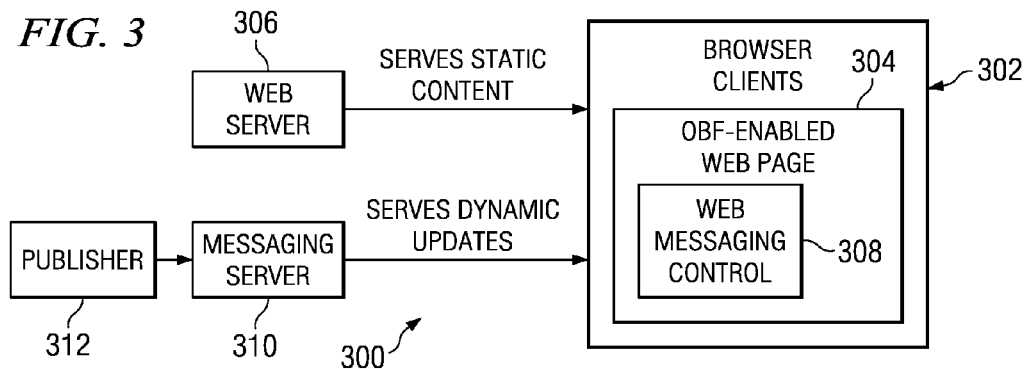
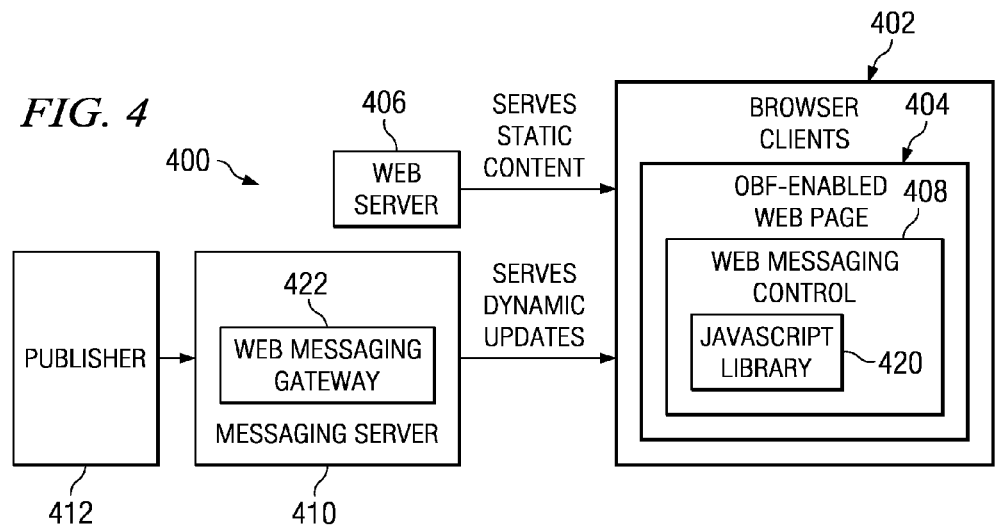
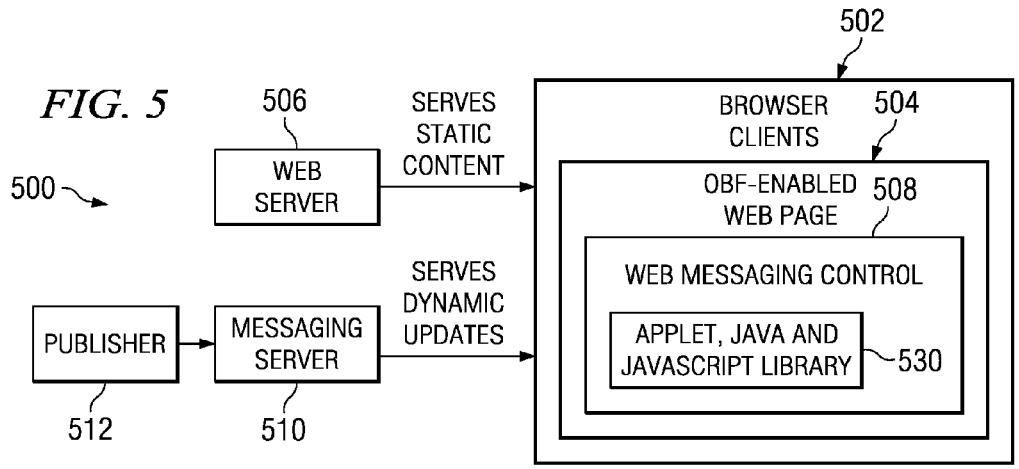

DYNAMICALLY UPDATING WEB PAGES USING MESSAGING-ORIENTED MIDDLEWARE

This application is a continuation of application Ser. No. 11/261,016, filed Oct. 28, 2005, now abandoned.

BACKGROUND OF THE INVENTION

1. Field of the Invention

The present invention relates generally to the data processing field, and more particularly, to a system, computer implemented method and computer program product for dynamically updating a Web page using browser-based messaging.

2. Description of the Related Art

The Web has created an incredible growth environment by making business applications easy to deploy, manage and access. As a result, the Web has replaced the client-server model fairly quickly. Based on open standards such as Java™, J2EE™ (Java™ 2 Platform Enterprise Edition), HTTP (Hyper Text Transfer Protocol), HTML (Hyper Text Markup Language) and JavaScript™, and the ubiquitous browser; enterprises are able to open up their "backends" and create an environment where employees and customers can readily access a variety of applications from any location at any time.

On the other hand, however, the Web has created a user experience that is considered to be a step backward from what existed in the client-server world. There, clients enjoyed arbitrary richness as provided by the hosting GUI (Graphical User Interface)-based operating system such as Microsoft® Windows®. Although Web interfaces can be made very graphical, the actual interactivity model is very restrictive. The perceptible performance gap and full screen refreshes between most interactions with the user, for instance, remain an important issue. ActiveX™ controls and the like attempt to remedy this in various ways but have failed to gain ubiquitous usage because of issues relating to the development model, security, performance and compatibility. Only Web pages with HTML, DHTML (Dynamic HTML), CSS (Cascading Style Sheets) and JavaScript™ have remained ubiquitous and widely used. Java™ applets to some extent can perform many tasks on browsers despite the difficulty of accommodating the variety of browsers with different JVMs (Java™ Virtual Machines) in use on the Internet as well as security restrictions.

The On-Demand Client Browser Framework (OBF) is a software framework which implements browser-based Service Data Objects (SDO), a Java™ standard model using JavaScript™, and includes a set of JavaScript™ UI widgets as well as a small server-side Java™ library for streaming data. The OBF tries to address many of the interactivity issues raised by the Web, but remains rooted in the traditional Web page architecture.

Based on an advanced usage of JavaScript in modern browsers such as IE 5.5 and above, Netscape® 6 and above, and Mozilla™ 1.x, the OBF seeks to create "Web pages that last longer". Composed with a dynamic model that packs more data, OBF enabled Web pages are able to sustain longer interactions with an end user without requiring roundtrips back to the server. By creating what effectively is an MVC (Model View Controller) model inside the page, a developer is able to define a working data set and a set of controls that dynamically bind to that data. Thus, the same data object can be shared among different widgets on the same page.

Consider, for example, a Web application for managing a user's stock portfolio. In this example, stock prices as well as asset allocation (percentage of the value of a particular stock in the total portfolio, i.e., price*shares/total value) needs to be displayed for users. A scrollable table display of data (sometimes referred to as a DataGrid) can be used to display asset allocation (stock issue, volume) for example, and the current price for a particular stock; and a pie chart can also be used to display the same information to a user. This data can be shared by the DataGrid and the pie chart at the same time. When any data object in the model is updated, the binding component in the OBF will notify the user interface objects, which are bound to the data object, to refresh themselves to reflect the latest changes. The user can then interact with the working data set, using the set of controls, and until a roundtrip back to the server is really necessary (e.g., to submit data, complete a transaction, etc.), the user benefits from response times and a freedom to interact with the page that is uncommon in regular Web pages.

While the OBF is able to cache a certain amount of data inside its data model on the Web page at the time of initial page loading, and can greatly improve the usability (interactivity and responsiveness) of Web pages, the data set that can be cached is still limited due to client computer memory constraints and incurred initial network delay from downloading a large data set. In addition, OBF-enabled Web pages lack an intrinsic facility for keeping the Data Objects current while they are on the user's screen. The above-described Web application of a stock portfolio is a good example of this. In this case, stock prices are changing with time and the Web pages have to be updated to keep up with the changes. In a standard Web application, data on a Web page can only be updated if the entire page is re-retrieved from the server. This is inefficient in that it requires a round trip of a request-response pair for each data refresh, and also loses any updates the user may have made on a different part of the same page.

In the OBF, one way of updating data in the model is made possible by using a browser-based WebService control. However, a user has to initiate a WebService call to update a data page by clicking a button or hyperlink on a Web page. It essentially is a pull-based model which requires user actively seeking the data and refreshing the Web page often.

A competitor of the OBF is AJAX. AJAX stands for Asynchronous JavaScript™ and XML (Extensible Markup Language), a term describing a Web development approach to creating interactive Web applications using a combination of technologies:

HTML, or XHTML (Extensible HTML), and CSS for information presentation

The Document Object Model manipulated through JavaScript™ to dynamically display and interact with the information presented The XMLHttpRequest object to retrieve data asynchronously from the Web server on the background.

The technologies used by AJAX have been available since 1997, however, several recent high-profile offerings from Google™ are AJAX applications, including Gmail™, Google™ Maps, Google™ Groups, etc. This has helped raise the profile of the technique and has made AJAX more popular among Internet developers.

Related to AJAX, a known solution of browser-based messaging is provided by ActiveMQ™ through its REST API (Application Program Interface). ActiveMQ™ is an open source JMS 1.1 provider and messaging middleware. AJAX support in ActiveMQ™ builds on top of the REST connector for ActiveMQ™, which allows Web capable devices to send or receive messages over JMS (Java™ Message Service).

Although OBF and AJAX share the same goals towards improving the usability of Web applications and use many of the same technologies (such as JavaScript™, HTML DOM (Document Object Model), CSS, etc.), there are considerable differences between them. OBF is well-architected using an MVC model on Web pages, as described above, with the model bound to widgets, thus allowing data sharing among widgets. By doing so, there is a clean separation between the data model and widgets. Any data update from the Web server is always made against the model. The model can be bound to any widget. With tooling help, Web page development using OBF can be made very flexible and easy to drag and drop. In contrast, there is no formal MVC model in AJAX, which uses XML as its data storage. The Web messaging of ActiveMQ™ uses XmlHttpRequest to make calls on the REST API to send and receive messages, and then an AJAX JavaScript™ library will manipulate the messages for presentation without involving a data model.

There is, accordingly, a need for a system and computer implemented method for dynamically updating a Web page using browser-based messaging to improve the usability and interactivity of Web applications.

SUMMARY OF THE INVENTION

The present invention provides a system, computer implemented method and computer program product for dynamically updating a Web page using browser-based messaging. A system for dynamically updating a Web page using browser-based messaging comprises a Web page that includes a plurality of Web messaging tags, and a selected data model that can be bound to the Web messaging tags, and at least one messaging client for accepting at least one message from a message server and for processing the accepted at least one message into the selected data model.

BRIEF DESCRIPTION OF THE DRAWINGS

The novel features believed characteristic of the invention are set forth in the appended claims. The invention itself, however, as well as a preferred mode of use, further objectives and advantages thereof, will best be understood by reference to the following detailed description of an illustrative embodiment when read in conjunction with the accompanying drawings, wherein:

FIG. 3 is a block diagram that schematically illustrates a Web Messaging architecture according to an exemplary embodiment of the present invention;

FIG. 4 is a block diagram that schematically illustrates a JavaScript™ Web Messaging implementation of the Web Messaging architecture illustrated in FIG. 3 according to an exemplary embodiment of the present invention;

FIG. 5 is a block diagram that schematically illustrates a Java™ Applet Web Messaging implementation of the Web Messaging architecture illustrated in FIG. 3 according to an exemplary embodiment of the present invention;

DETAILED DESCRIPTION OF THE PREFERRED EMBODIMENT

Figure 1:
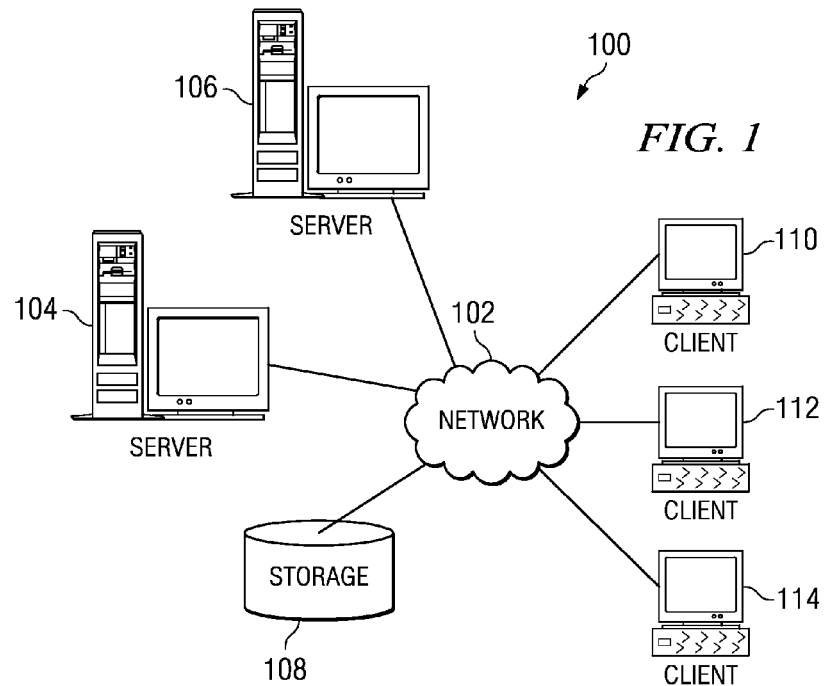
FIG. 1 depicts a pictorial representation of a network of data processing systems in which aspects of the present invention may be implemented.
Figure 2:
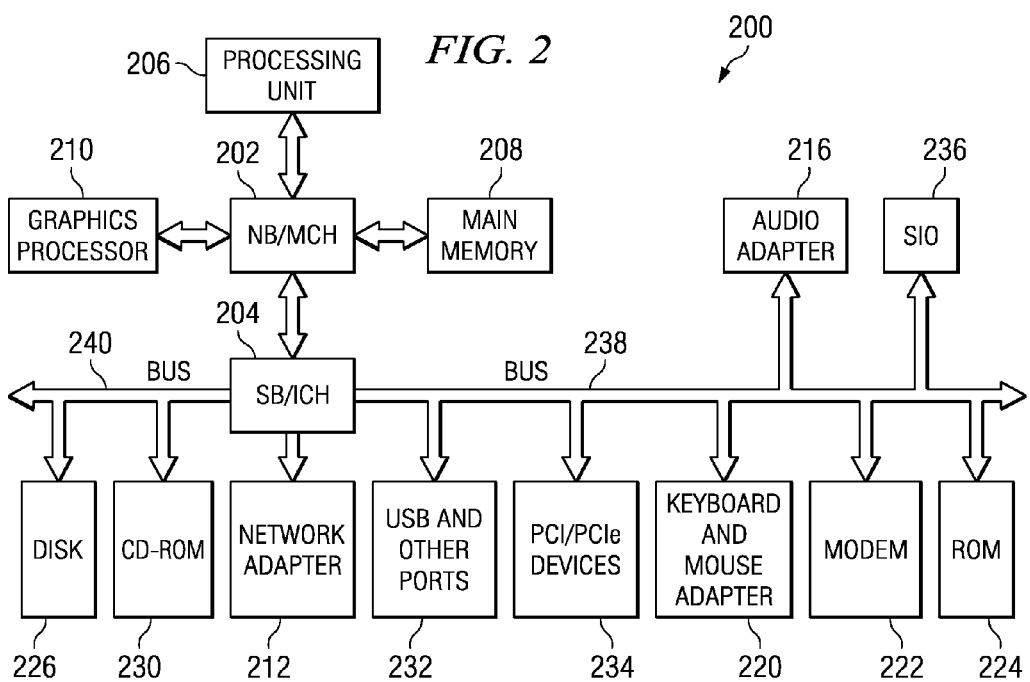
FIG. 2 depicts a block diagram of a data processing system in which aspects of the present invention may be implemented.

FIGS. 1-2 are provided as exemplary diagrams of data processing environments in which embodiments of the present invention may be implemented. It should be appreciated that FIGS. 1-2 are only exemplary and are not intended to assert or imply any limitation with regard to the environments in which aspects or embodiments of the present invention may be implemented. Many modifications to the depicted environments may be made without departing from the spirit and scope of the present invention.

With reference now to the figures, FIG. 1 depicts a pictorial representation of a network of data processing systems in which aspects of the present invention may be implemented. Network data processing system 100 is a network of computers in which embodiments of the present invention may be implemented. Network data processing system 100 contains network 102, which is the medium used to provide communications links between various devices and computers connected together within network data processing system 100. Network 102 may include connections, such as wire, wireless communication links, or fiber optic cables.

In the depicted example, server 104 and server 106 connect to network 102 along with storage unit 108. In addition, clients 110, 112, and 114 connect to network 102. These clients 110, 112, and 114 may be, for example, personal computers or network computers. In the depicted example, server 104 provides data, such as boot files, operating system images, and applications to clients 110, 112, and 114. Clients 110, 112, and 114 are clients to server 104 in this example. Network data processing system 100 may include additional servers, clients, and other devices not shown. Specifically, clients may connect to any member of a network of servers which provide equivalent content.

In the depicted example, network data processing system 100 is the Internet with network 102 representing a worldwide collection of networks and gateways that use the Transmission Control Protocol/Internet Protocol (TCP/IP) suite of protocols to communicate with one another. At the heart of the Internet is a backbone of high-speed data communication lines between major nodes or host computers, consisting of thousands of commercial, government, educational and other computer systems that route data and messages. Of course, network data processing system 100 also may be implemented as a number of different types of networks, such as for example, an intranet, a local area network (LAN), or a wide area network (WAN). FIG. 1 is intended as an example, and not as an architectural limitation for different embodiments of the present invention.

With reference now to FIG. 2, a block diagram of a data processing system is shown in which aspects of the present invention may be implemented. Data processing system 200 is an example of a computer, such as server 104 or client 110 in FIG. 1, in which computer usable code or instructions implementing the processes for embodiments of the present invention may be located.

In the depicted example, data processing system 200 employs a hub architecture including north bridge and memory controller hub (MCH) 202 and south bridge and input/output (I/O) controller hub (ICH) 204. Processing unit 206, main memory 208, and graphics processor 210 are connected to north bridge and memory controller hub 202. Graphics processor 210 may be connected to north bridge and memory controller hub 202 through an accelerated graphics port (AGP).

In the depicted example, local area network (LAN) adapter 212 connects to south bridge and I/O controller hub 204. Audio adapter 216, keyboard and mouse adapter 220, modem 222, read only memory (ROM) 224, hard disk drive (HDD) 226, CD-ROM drive 230, universal serial bus (USB) ports and other communications ports 232, and PCI/PCIe devices 234 connect to south bridge and I/O controller hub 204 through bus 238 and bus 240. PCI/PCIe devices may include, for example, Ethernet adapters, add-in cards and PC cards for notebook computers. PCI uses a card bus controller, while PCIe does not. ROM 224 may be, for example, a flash binary input/output system (BIOS).

Hard disk drive 226 and CD-ROM drive 230 connect to south bridge and I/O controller hub 204 through bus 240. Hard disk drive 226 and CD-ROM drive 230 may use, for example, an integrated drive electronics (IDE) or serial advanced technology attachment (SATA) interface. Super I/O (SIO) device 236 may be connected to south bridge and I/O controller hub 204.

An operating system runs on processing unit 206 and coordinates and provides control of various components within data processing system 200 in FIG. 2. As a client, the operating system may be a commercially available operating system such as Microsoft® Windows® XP (Microsoft® and Windows® are trademarks of Microsoft Corporation in the United States, other countries, or both). An object-oriented programming system, such as the Java™ programming system, may run in conjunction with the operating system and provides calls to the operating system from Java™ programs or applications executing on data processing system 200 (Java™ is a trademark of Sun Microsystems, Inc. in the United States, other countries, or both).

As a server, data processing system 200 may be, for example, an IBM® eServer pSeries® computer system, running the Advanced Interactive Executive (AIX®) operating system or LINUX® operating system (eServer, pSeries® and AIX® are trademarks of International Business Machines Corporation in the United States, other countries, or both while Linux® is a trademark of Linus Torvalds in the United States, other countries, or both). Data processing system 200 may be a symmetric multiprocessor (SMP) system including a plurality of processors in processing unit 206. Alternatively, a single processor system may be employed.

Instructions for the operating system, the object-oriented programming system, and applications or programs are located on storage devices, such as hard disk drive 226, and may be loaded into main memory 208 for execution by processing unit 206. The processes for embodiments of the present invention are performed by processing unit 206 using computer usable program code, which may be located in a memory such as, for example, main memory 208, read only memory 224, or in one or more peripheral devices 226 and 230.

Those of ordinary skill in the art will appreciate that the hardware in FIGS. 1-2 may vary depending on the implementation. Other internal hardware or peripheral devices, such as flash memory, equivalent non-volatile memory, or optical disk drives and the like, may be used in addition to or in place of the hardware depicted in FIGS. 1-2. Also, the processes of the present invention may be applied to a multiprocessor data processing system.

In some illustrative examples, data processing system 200 may be a personal digital assistant (PDA), which is configured with flash memory to provide non-volatile memory for storing operating system files and/or user-generated data.

A bus system may be comprised of one or more buses, such as bus 238 or bus 240 as shown in FIG. 2. Of course the bus system may be implemented using any type of communications fabric or architecture that provides for a transfer of data between different components or devices attached to the fabric or architecture. A communications unit may include one or more devices used to transmit and receive data, such as modem 222 or network adapter 212 of FIG. 2. A memory may be, for example, main memory 208, read only memory 224, or a cache such as found in north bridge and memory controller hub 202 in FIG. 2. The depicted examples in FIGS. 1-2 and above-described examples are not meant to imply architectural limitations. For example, data processing system 200 also may be a tablet computer, laptop computer, or telephone device in addition to taking the form of a PDA.

The present invention is directed to a system, computer implemented method and computer program product for dynamically updating a Web page using browser-based messaging in order to improve the usability and interactivity of Web applications. According to an exemplary embodiment of the present invention, Web page content is dynamically updated with On Demand Client Browser Framework (OBF) enabled Web pages. More particularly, On Demand Client (ODC)-enabled Web page data models are updated using a new technique, referred to as "Web Messaging", that reduces round trips to a Web server by employing a publish/subscribe message broker to push updates to a client.

Real time update of data that changes often in a page is more efficient via push mode than an entire page refresh, and also allows for the preservation of local user changes and is more user friendly than updating via Web Service. Web Messaging is an extension of the publish/subscribe messaging system and employs a different paradigm from that of Web Service. The publish/subscribe messaging model is a push-based model where messages are automatically broadcast to users, for example, as Web pages, without the users having to issue requests for new messages.

According to an exemplary embodiment of the present invention, a Web Messaging control, comprising several JSF (Java™ Server Faces) tags, enables end users to access publish/subscribe messaging systems from Web browsers, and allows data on Web pages to be dynamically updated. JSF is a user interface (UI) framework for Java™ Web applications, and a new J2EE Standard. JSF is designed to significantly ease the burden of writing and maintaining Java™ Web applications, and includes a set of controls, including common Web controls (command button, input text, radio button, etc.) and extended controls (Data table, TabbedPanel, RichText, FileUpload) and related infrastructure. These JSF tags for Web Messaging can be deployed on a Web page using JSF tooling and allows a Web developer to configure the control (specifying messaging server port number, message topic and attributes, etc.), wherein the JSF tags include a set of Java™ programs for generating necessary JavaScript™ and HTML code as well as JavaScript™ library includes on Web pages.

According to a further exemplary embodiment of the invention, a computer program product stored on a computer usable medium is provided that will update the OBF model on a Web page by pushing real time information from a messaging system. The messaging data will then be rendered using JSF UI controls (such as DataGrid and InputText, etc.). This cleanly separates the population of a data model from rendering the data on a JSP (JavaServer™ Pages).

According to a further exemplary embodiment of the invention, a message published on a Messaging server is transported to a Web page, processed and the model updated on the page, which eventually will cause UI widgets to refresh themselves due to binding and will allow end users to see data changes in the Web application. As will be explained more fully hereinafter, two flavors of Web Messaging implementations are supported according to exemplary embodiments of the invention, including Java™ Applet and JavaScript™ Web messaging clients.

According to yet another exemplary embodiment of the present invention, a method is provided for deploying an application that allows data to be dynamically updated on a Web page. The method includes providing a computer infrastructure operable to update a data model on a Web page that can generate necessary HTML and JavaScript™ code, and that includes JavaScript™ library or Java™ Applet, wherein JavaScript™ or Java™ Applet code can transport a message published on a messaging server to a Web page, process the message and update the model on the page, which will eventually cause the UI widgets to refresh themselves due to binding.

As was briefly discussed above, the OBF is able to cache a certain amount of data inside its data model on a Web page at the time of initial page loading, and can greatly improve the usability (interactivity and responsiveness) of Web pages. OBF-enabled Web pages, however, lack an intrinsic facility for keeping Data Objects current while they are on a user's screen. In the exemplary Web application of a stock portfolio described previously, stock prices change with time and the Web pages have to be updated in order to keep up with the changes.

FIG. 3 is a block diagram that schematically illustrates a Web Messaging architecture according to an exemplary embodiment of the present invention. In particular, FIG. 3 is a high level diagram that illustrates the interaction of a Web server, a messaging server and browsers at runtime.

The Web Messaging architecture is generally designated by reference number 300. An end user at one of browser clients 302 has requested OBF-enabled Web page 304 which displays his/her stock portfolio information. As a result, a Java™ Server Page (JSP) with a data grid showing portfolio composition with current stock prices, as well as a pie chart graphically displaying the same information, is downloaded from Web server 306. At the same time, necessary JavaScript™ code included with Web Messaging control 308 is generated and downloaded along with the rest of OBF-enabled Web page 304. Web Messaging control 308 on OBF-enabled Web page 304 establishes a connection with Messaging server 310 based on the configuration (port number and topic, etc.) set up on the page by a Web application developer.

Publisher 312 continuously publishes stock prices through Messaging server 310. Messaging server 310 broadcasts the messages to its message clients based on their topic subscriptions, in this case, Web browser clients 302. Web Messaging control 308 on OBF-enabled Web page 304 processes the messages and updates the OBF model on the page. Eventually, the end user will be able to see the stock prices updating automatically.

According to exemplary embodiments of the present invention, two flavors of Web Messaging implementations are provided, namely JavaScript™ and Java™ Applet Web messaging clients; and a Web developer can choose between them based on their environment and requirements. A Web developer, however, will only have to deal with the same set of JSP tags or HTML tags by setting up slightly different parameters on one of the tags. An end user will not readily see the difference between the two configurations.

FIG. 4 is a block diagram that schematically illustrates a JavaScript™ Web Messaging implementation of the Web Messaging architecture illustrated in FIG. 3 according to an exemplary embodiment of the present invention. The implementation is generally designated by reference number 400, and uses corresponding reference numbers to identify corresponding components in the architecture illustrated in FIG. 3. Implementation 400 includes JavaScript™ library 420 on browser clients 402 maintaining communication with Messaging server 410 via Web Messaging gateway 422 using HTTP tunneling and issuing HTTP requests and responses inside HTML iframes.

FIG. 5 is a block diagram that schematically illustrates a Java™ Applet Web Messaging implementation of the Web messaging architecture illustrated in FIG. 3 according to an exemplary embodiment of the present invention. The implementation is generally designated by reference number 500 and also uses corresponding reference numbers to identify corresponding components in the architecture illustrated in FIG. 3. As shown in FIG. 5, there are applet, Java™ Messaging client API and JavaScript™ library 530 on browser clients 502 maintaining communication with Messaging server 510.

Figure 6:
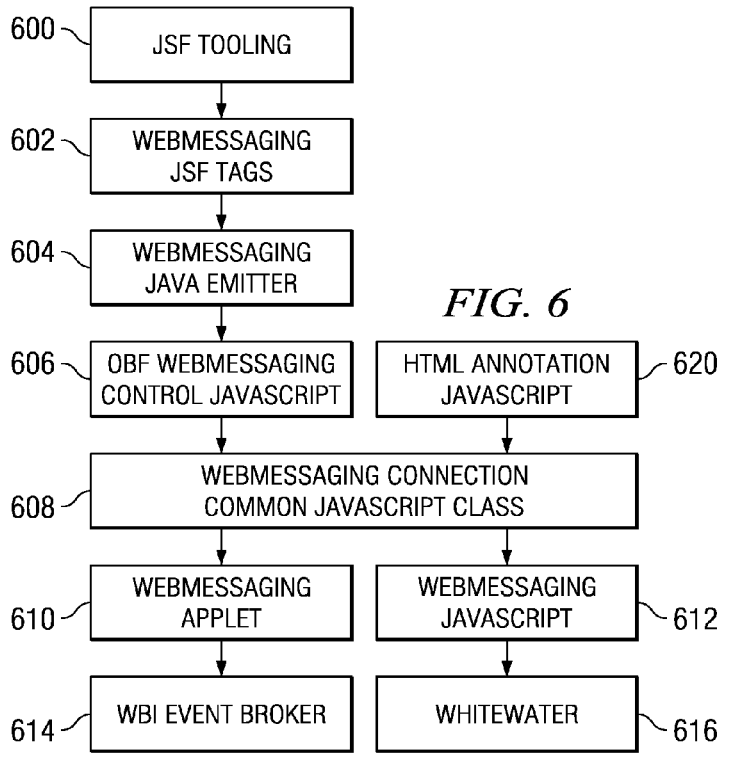
FIG. 6 is a diagram that schematically illustrates interaction between various components and layers of a Web Messaging control according to an exemplary embodiment of the present invention.

FIG. 6 is a diagram that schematically illustrates how various components and layers of a Web Messaging control interact with one another according to an exemplary embodiment of the present invention. On top is JSF tooling 600 which enables a developer to drag and drop WebMessaging tags to a JSP, to bind the control to a model, to set up a message topic, to map model object attributes with message properties and to perform other configuration activities. In this layer, the developer will make a decision regarding which Messaging client type (JavaScript™ or Java™ Applet) will be used. A flag (messaging type) will be passed to the layers below. Based on the Messaging client decision, necessary resources (JavaScript™ files, Jars, zips, etc.) will be copied to the appropriate directories inside the project.

Immediately below JSF tooling 600 is WebMessaging JSF tag runtime implementation 602, which is a very thin layer and delegates most of the rendering work to the layer below it, namely, WebMessaging Java™ emitter 604. WebMessaging Java™ emitter 604 exports all necessary JavaScript™ code for WebMessaging control.

OBF WebMessaging control JavaScript™ layer 606 handles interfacing with the OBF model as well as layers below. At the startup of a Web page, data in the OBF model is used to configure message topics, which in turn is used for message subscription. WebMessaging control is bound with the OBF model. When any object, whose parent is bound to the message topic templates, is created or deleted, an event is fired to add or remove message subscriptions. If any attribute of a model object, which is used to make up the message topic by substituting tokens inside topic templates, is updated, an event is also fired to remove the old topic if no more subscriptions exist for the topic, and to add a new message topic if the topic has not yet been subscribed. This layer also tracks the relationship between topics and model objects. When a message arrives, the right model object(s) will be updated based on this mapping.

WebMessagingConnection common JavaScript™ interface layer 608 is designed to provide a uniform JavaScript™ interface for Web Messaging regardless of whether the user decides to use a JavaScript™ or Applet Messaging client type which is linked to different Messaging servers. Based on the flag (messaging type) passed down from layers above, this layer will set up necessary resources. If the Applet Messaging client type is used, an applet will be instantiated here. This layer can also directly serve the common interface for HTML annotation JavaScript™ 620 for Web Messaging as shown in FIG. 6.

At the bottom, based on the flag (messaging type), either WebMessaging Java™ Applet layer 610 using WebSphere Business Integration (WBI) Event Broker 614, or WebMessaging JavaScript™ layer 612 using Whitewater messaging engine 616 is used to connect with backend messaging systems. These two options will be discussed more fully below.

WebMessaging Java™ Applet 610 supports a set of publish/subscribe messaging actions to communicate with back-end WBI Event Broker 614. WebMessaging Java™ Applet 610 enables both a real time update of Web pages with messages from WBI Event Broker 614 and the publication of messages to the broker.

WebMessaging Java™ Applet 610 uses a specialized subset of the standard JMS API to maximize the JMS functionality that is available while limiting the applet and supporting class download size to approximately 100 kilobytes. The messaging support classes are contained in the file "minimal.zip" which is distributed with the applet and is made available in the application project. Although JMS supports many types of messages, Web Messaging uses only standard String JMS message properties for subscriptions. This technique facilitates mapping of fields within messages to browser model data or Web page elements.

WebMessaging Java™ Applet 610 only provides a set of APIs that the JavaScript™ layer above can call, and expects a callback handler. The callback handler will be a JavaScript™ object, which represents common WebMessaging JavaScript™ interface object 608 above. When a message arrives, the applet calls the handler so that the OBF model will be updated.

The overall JavaScript™ client component comprises essentially two sub-components, a client JavaScript™ library in WebMessaging JavaScript™ layer 612 and a protocol handler embedded in messaging engine 616. The JavaScript™ client provides the client side functionality required to interact with the server side protocol handler, and, hence, provides topic-based messaging services to Web applications. The client library is supplied in a ".js" file that can be referenced by an HTML document and processed by a Web browser. The library includes core messaging functionality (such as connect, send, addConsumers and disconnect), and the ability to register callback functions such that message event driven programming can be achieved in the JavaScript™ environment.

The JavaScript™ messaging client provides the following benefits:

A "minimal" footprint messaging client (about 30 k) suitable for use in the Web domain Leverage of ubiquitous client technologies such as HTML and JavaScript™ to minimize requirements on the client machine other than standard browser environments.

According to an exemplary embodiment of the present invention, the library also includes optional layer 620 on top of the basic messaging API to provide HTML annotation Web Messaging capability in the client browser. HTML annotation Web Messaging allows a page developer to directly annotate HTML elements in a page with topic names such that contents of those elements can be populated with message driven data in the user's browser client.

Figure 7:
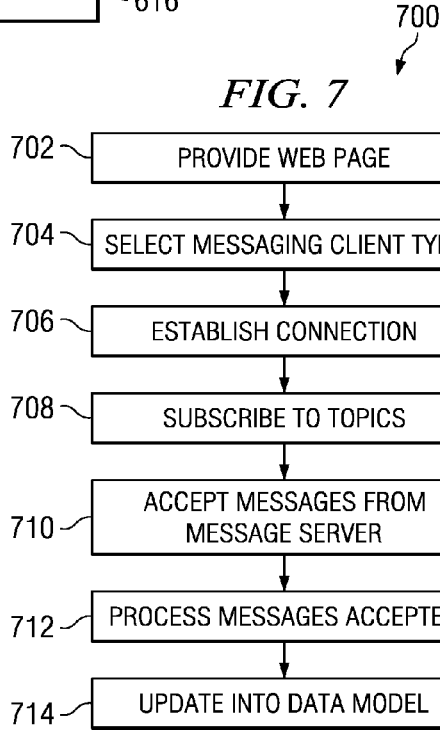
FIG. 7 is a flowchart that illustrates a method for dynamically updating a Web page according to an exemplary embodiment of the present invention.

FIG. 7 is a flowchart that illustrates a method for dynamically updating a Web page according to an exemplary embodiment of the present invention. The method is generally designated by reference number 700, and begins by providing a Web page that includes Web messaging tags, JavaScript™ and, potentially, a Java™ library, and a selected data model that can be bound to the Web messaging tags (Step 702). A messaging client type is also selected (Step 704). A connection is established to a Messaging server (Step 706), and topics are subscribed to from the Messaging server (Step 708). Published messages relating to the subscribed topics are then accepted from the Message server (Step 710), the accepted messages are processed (Step 712), and the messages are updated into the data model to update the Web page (Step 714).

It should be appreciated that while exemplary embodiments of the present invention are described herein with reference to updated Web pages using Web Messaging in an On Demand Client Browser Framework (OBF) environment, the techniques described herein could also be applied in other client-based processes that requires data updating without departing from the scope of the present invention.

It should also be appreciated that the Web browser, the OBF-enabled Web page, and the Web Messaging control may be stored in computer system memory such that the functional components of the OBF-enabled Web page are provided as a computer program product. The present invention can also be offered as a method on a subscription or fee basis. For example, the OBF Web page and the Web Messaging can be created, maintained, supported and/or deployed by a service provider that offers the functions described herein for customers. That is, a service provider can be used to provide OBF-enabled Web pages with Web Messaging as described above.

The present invention thus provides a system, computer implemented method and computer program product for dynamically updating a Web page using browser-based messaging. A system for dynamically updating a Web page according to an exemplary embodiment of the present invention includes a Web page that includes a plurality of Web messaging tags, and a selected data model that can be bound to the Web messaging tags, and at least one messaging client for accepting at least one message from a message server and for processing the accepted at least one message into the selected data model.

The invention can take the form of an entirely hardware embodiment, an entirely software embodiment or an embodiment containing both hardware and software elements. In a preferred embodiment, the invention is implemented in software, which includes but is not limited to firmware, resident software, microcode, etc.

Furthermore, the invention can take the form of a computer program product accessible from a computer-usable or computer-readable medium providing program code for use by or in connection with a computer or any instruction execution system. For the purposes of this description, a computer-usable or computer readable medium can be any tangible apparatus that can contain, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and DVD.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modem and Ethernet cards are just a few of the currently available types of network adapters.

The description of the present invention has been presented for purposes of illustration and description, and is not intended to be exhaustive or limited to the invention in the form disclosed. Many modifications and variations will be apparent to those of ordinary skill in the art. The embodiment was chosen and described in order to best explain the principles of the invention, the practical application, and to enable others of ordinary skill in the art to understand the invention for various embodiments with various modifications as are suited to the particular use contemplated.

What is claimed is:

1. A system for dynamically updating a Web page using browser-based messaging, comprising:
    a processor coupled to a memory;
    a Web page that includes a plurality of Web messaging tags, and a selected data model bound to the Web messaging tags; and
    at least one messaging client accepting at least one message from a message server and processing the accepted at least one message into the data model,
    wherein responsive to a request for the Web page and simultaneously with a downloading of the Web page, computer code included in a web messaging control component of the web page is generated and downloaded along with the Web page, and
    wherein the computer code
        establishes a connection with the message server based on a configuration including a port number and a topic,
        transports the at least one message published on the message server to the Web page,
        updates a portion of the data model using the message and without performing a page refresh, and
        updates the Web messaging tags to reflect the updates in the data model.

2. The system according to claim 1, wherein the plurality of Web messaging tags comprises a plurality of Web message tags in at least one of a server-side component that generates responses and Hyper Text Markup Language.

3. The system according to claim 2, wherein a plurality of Web messaging tags comprises a plurality of Web messaging attributes in Hyper Text Markup Language for dynamically updating data directly into a Document Object Model on the Web page.

4. The system according to claim 1, wherein the plurality of Web messaging tags comprises Web messaging tags for configuring a port number of the message server, for selecting a messaging client type, for binding messaging topic and property to the data model on the Web page, and for generating code for an object-oriented scripting language used to enable programmatic access to objects within both the client application and other applications.

5. The system according to claim 1, wherein the selected data model comprises an On Demand Client Browser Framework data model.

6. The system according to claim 1, wherein the at least one messaging client comprises one of a messaging client type that uses code for an object-oriented scripting language used to enable programmatic access to objects within both the client application and other applications and a messaging client type that uses programs that are embedded in other applications, in the web page displayed in a web browser for accepting the at least one message from the message server, for processing the accepted at least one message, and for updating the accepted at least one message into the selected data model.

7. The system according to claim 6, wherein the messaging client comprises the type that uses programs that are embedded in other applications, in the web page displayed in a web browser, and wherein the system further comprises libraries for an object-oriented scripting language used to enable programmatic access to objects within both the client application and other applications and a library which programs can call at runtime for accepting the at least one message from the message server, for processing the accepted at least one message, and for updating the accepted at least one message into the selected data model.

8. The system according to claim 6, and further comprising a server-side library for handling communication with the at least one messaging client.

9. A computer implemented method for dynamically updating a Web page using browser-based messaging, comprising:
    providing a Web page that includes a plurality of Web messaging tags, and a selected data model that can be bound to the Web messaging tags;
    establishing a connection to a message server;
    subscribing to at least one topic from the message server;
    receiving at least one message relating to the at least one subscribed topic from the message server; and
    updating the received at least one message into the data model to update the Web page, wherein, responsive to a request for the Web page and simultaneously with a downloading of the Web page, computer code included in a web messaging control component of the web page is generated and downloaded along with the Web page, and wherein the computer code establishes a connection with the message server based on a configuration including a port number and a topic, transports the at least one message published on the message server to the Web page, updates a portion of the data model using the message and without performing a page refresh, and updates the Web messaging tags to reflect the updates in the data model.

10. The computer implemented method according to claim 9, wherein providing a Web page that includes a plurality of Web Messaging tags and a selected data model that can be bound to the Web messaging tags, comprises:
    providing a plurality of Web messaging tags in at least one of a server-side component that generates responses and Hyper Text Markup Language.

11. The computer implemented method according to claim 9, wherein providing a Web page that includes a plurality of Web Messaging tags and a selected data model that can be bound to the Web messaging tags, comprises:
    providing a plurality of Web messaging tags for configuring a port number of the message server, for selecting a messaging client type, for binding messaging topic and property to the data model on the Web page, and for generating code for an object-oriented scripting language used to enable programmatic access to objects within both the client application and other applications.

12. The computer implemented method according to claim 9, wherein the selected data model comprises an On Demand Client Browser Framework data model.

13. The computer implemented method according to claim 9, and further comprising:
   selecting a messaging client of one of a messaging client type that uses code for an object-oriented scripting language used to enable programmatic access to objects within both the client application and other applications and a messaging client type that uses programs that are embedded in other applications, in the web page displayed in a web browser for accepting the at least one message from the message server, for processing the accepted at least one message, and for updating the accepted at least one message into the selected data model.

14. The computer implemented method according to claim 13, wherein selecting a messaging client of one of a messaging client type that uses code for an object-oriented scripting language used to enable programmatic access to objects within both the client application and other applications and a messaging client type that uses programs that are embedded in other applications, in the web page displayed in a web browser comprises selecting a messaging client of a messaging client type that uses programs that are embedded in other applications, in the web page displayed in a web browser, and wherein the method further comprises:
   providing libraries for an object-oriented scripting language used to enable programmatic access to objects within both the client application and other applications and a library which programs can call at runtime for accepting the at least one message from the message server, for processing the accepted at least one message, and for updating the accepted at least one message into the selected data model.

15. The computer implemented method according to claim 9, and further comprising:
   providing a server-side library for handling communication with the at least one messaging client.

16. A computer program product comprising:
   one or more non-transitory computer readable storage devices;
   computer usable program code stored in the one or more computer readable storage devices for dynamically updating a Web page using browser-based messaging, the computer program product comprising:
   computer usable program code stored in the one or more computer readable storage devices for providing a Web page that includes a plurality of Web messaging tags, and a selected data model that can be bound to the Web messaging tags;
   computer usable program code stored in the one or more computer readable storage devices for establishing a connection to a message server;
   computer usable program code stored in the one or more computer readable storage devices for subscribing to at least one topic from the message server;
   computer usable program code stored in the one or more computer readable storage devices for receiving at least one message relating to the at least one subscribed topic from the message server; and
   computer usable program code stored in the one or more computer readable storage devices for updating the received at least one message into the data model to update the Web page, wherein, responsive to a request for the Web page and simultaneously with a downloading of the Web page, computer code included in a web messaging control component of the web page is generated and downloaded along with the Web page, and wherein the computer code establishes a connection with the message server based on a configuration including a port number and a topic, transports the at least one message published on the message server to the Web page, updates a portion of the data model using the message and without performing a page refresh, and updates the Web messaging tags to reflect the updates in the data model.

17. The computer program product according to claim 16, wherein the computer usable program code for providing a Web page that includes a plurality of Web messaging tags, and a selected data model that can be bound to the Web messaging tags, comprises:
   computer usable program code for providing the plurality of Web messaging tags in one of a server-side component that generates responses or Hyper Text Markup Language.

18. The computer program product according to claim 16, wherein the computer program code for providing a Web page that includes a plurality of Web Messaging tags, and a selected data model that can be bound to the Web messaging tags, comprises:
   computer usable program code for providing a plurality of Web messaging tags for configuring a port number of the message server, for selecting a messaging client type, for binding messaging topic and property to the data model on the Web page and for generating code for an object-oriented scripting language used to enable programmatic access to objects within both the client application and other applications.

19. The computer program product according to claim 16, and further comprising:
   computer program code for selecting a messaging client type of one of a type that uses an object-oriented scripting language used to enable programmatic access to objects within both the client application and other applications and a type that uses programs that are embedded in other applications, in the web page displayed in a web browser, for accepting the at least one message from the message server, for processing the accepted at least one message, and for updating the accepted at least one message into the selected data model.

20. A computer implemented method for dynamically updating a Web page, comprising:
   providing a computer infrastructure configured to:
      serve a Web page that includes a plurality of Web messaging tags, and an On Demand Client Browser Framework model which can be bound to the plurality of Web messaging tags; and
   publishing at least one message for broadcast to at least one Web messaging client that has subscribed to at least one message topic, wherein the Web page establishes a connection with the message server, transports the at least one message published on the message server to the Web page, updates the data model on the Web page, and updates the Web messaging tags to reflect the updates in the data model.

* * * * *